J. W. JACKSON.
CLUTCH PULLEY.
APPLICATION FILED NOV. 11, 1916.
1,302,926.
Patented May 6, 1919.
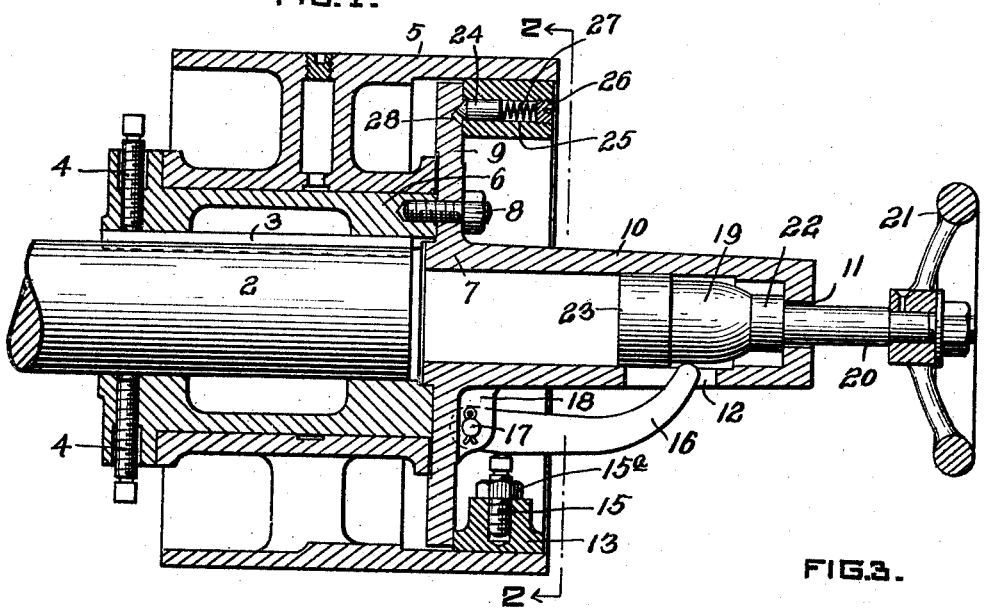
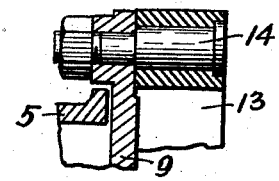
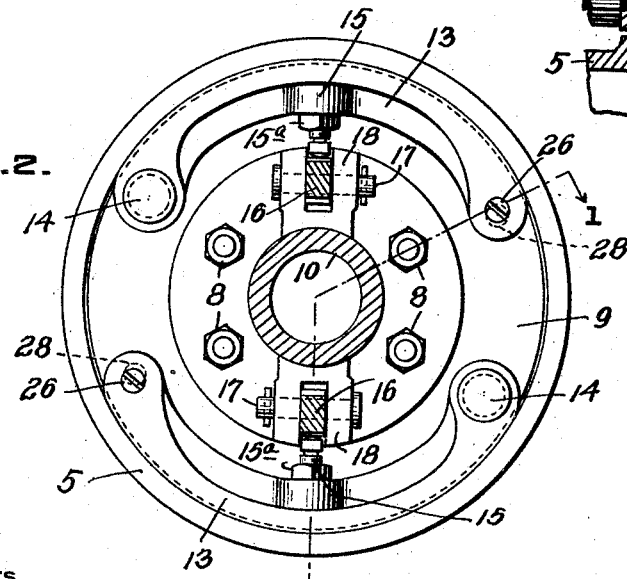
WITNESSES
INVENTOR

UNITED STATES PATENT OFFICE.

JOHN W. JACKSON, OF BRADFORD, PENNSYLVANIA, ASSIGNOR TO OIL WELL SUPPLY COMPANY, OF PITTSBURGH, PENNSYLVANIA, A CORPORATION OF PENNSYLVANIA.

CLUTCH-PULLEY.

1,302,926.  Specification of Letters Patent.  Patented May 6, 1919.

Application filed November 11, 1916. Serial No. 130,714.

*To all whom it may concern:*

Be it known that I, JOHN W. JACKSON, a citizen of the United States, residing at Bradford, in the county of McKean and State of Pennsylvania, have invented certain new and useful Improvements in Clutch-Pulleys, of which the following is a specification.

The prime object of my invention is to provide a new and improved clutch pulley particularly designed for attachment to an end of an engine shaft.

Further objects of the present invention are to provide a construction employing a small number of parts, means for taking up the wear between the shoes and the pulley wheel, and efficient and quick-acting clutch actuating means.

In the accompanying drawing which illustrates an application of my invention,

Figure 1 is a longitudinal sectional view of a clutch pulley embodying my invention applied to the end of an engine shaft, the section being taken on line 1—1 of Fig. 2.

Fig. 2 is a face view partly in section taken on line 2—2 of Fig. 1.

Fig. 3 is a detailed sectional view particularly showing the manner of mounting a shoe and securing the same to the cap of the clutch body.

Referring to the drawing, 2 designates an end of an engine shaft to which my clutch pulley is designed to be attached, the clutch being fixedly secured thereto by means of a key 3 and set screws 4, the latter being provided to prevent a sliding movement of the clutch on said shaft. 5 designates a pulley wheel.

The clutch proper, as illustrated and as preferred, comprises a body or hub member 6 and a cap 7, the latter being secured to the body by means of a series of set screws 8. Cap 7 includes an annular plate member 9 of greater diameter than the diameter of the body member and of slightly less diameter than the interior periphery of the pulley wheel, and an elongated hollow member 10 projecting outwardly from plate member 9 in line with the engine shaft and arranged to extend beyond the pulley wheel. The elongated member 10 is preferably formed integral with plate 9 and is of the form of a slightly tapering cylindrical body having its outer end provided with an opening 11 constituting a bearing for a slidable member hereinafter referred to. In addition to said opening 11, member 10 is provided with oppositely disposed slots 12.

The clutching mechanism of my construction is all carried from and supported by the cap 7 and comprises two curved and pivotally mounted clutch or friction shoes 13 secured to plate member 9 by counter-sunk bolts 14 passed through an end of the shoe and through plate member 9, as particularly shown in Fig. 3. As shown, I employ two friction shoes of substantially the same form and of such dimensions as to provide a considerable amount of contact surface for the interior periphery of the pulley wheel. Each of the shoes is provided with an adjusting means including a stud 15 and a lock nut 15ª designed to make contact with a pivotally mounted arm or lever 16. In practice, I employ two arms or levers 16 each of similar character and each secured to the cap by means of a pin 17 passed through apertured lugs 18 formed integral with the plate member 9.

The outer ends of the pivotally mounted arms 16 are designed to be entered in the slots 12 of the elongated member 10 and to make contact with a conical head 19 carried on a slidable shaft 20, the latter projecting through the opening 11 of member 10. 21 designates an operating handle having a loose fit on the outer end of shaft 20. As shown, head 19 is located on the shaft between collars 22 and 23 and is adapted to be moved within the hollow member 10 both outwardly and inwardly relative to the clutch and over slots 12. As shown in Fig. 1, the head is in its extreme outer position thus causing the friction shoes, through the action of arms 16 and the adjustable engaging members 15 to be brought into contact with the pulley wheel. By means of the relatively long leverage of arms 16, considerable power is exerted on the shoes and as the contacting surfaces of the shoes are so extensive, the frictional engagement of shoes and pulley is highly efficient.

From the construction illustrated, it will be apparent that the movements of the shoes toward and away from the pulley are very slight, thus permitting me to employ simple and efficient means for freeing the shoes from the pulley after the stress on arms 16 is released by an inward movement of the clutch actuating means. The means shown for this purpose include a spring pressed conically pointed pin 24 located in an opening 25 formed in the shoe. Opening 25 also contains a plug 26 and a spring 27. The point of pin 24 is entered in a recess or socket 28 on cap member 9 and is adapted to be permanently positioned therein regardless of the position of the shoe relative to the interior periphery of the pulley. The recess or socket 28 is conical in form or complemental with the conical end of pin 24. When tension is applied to arm 16, the shoes come out against the pulley. This causes the point of the pin to be dragged a slight distance away from the center of the conical recess, not sufficient, however, to cause the pin to disengage itself from the recess, and, as soon as the stress on arm 16 is released, the point of the pin will be moved back into the center or point of the recess 28 by the action of the spring 27, thereby allowing the shoe to free itself from the pulley.

Wear on the shoes or pulley wheel may be taken care of by manipulating the contacting adjusting means interposed between the shoes and the arms 16, thus by releasing lock nut 15ª stud 15 may be readily adjusted to the desired position.

What I claim is:—

1. In a clutch pulley, the combination with a rotatable shaft, of a clutch body member mounted on and fixedly secured to the shaft, a pulley loosely mounted on said body, a cap including a plate and an elongated hollow member secured to the outer end of the clutch body member, clutch mechanism including pivotally mounted friction members adapted to engage the pulley carried by the cap, and slidable clutch actuating means operative in the elongated member.

2. In a clutch pulley, the combination with a rotatable shaft, of a clutch body member mounted on and fixedly secured to the shaft, a pulley loosely mounted on said body, a cap including a plate and an elongated hollow slotted member secured to the outer end of the clutch body, clutch mechanism carried by the cap and including a pivotally mounted friction shoe and a lever having an end projecting outwardly from the pulley and entered in a slot of the elongated member, and slidable clutch actuating means operative in the elongated member and coacting with said lever.

3. In a clutch pulley, the combination with a rotatable shaft, of a clutch body member mounted on and fixedly secured to the shaft, a pulley loosely mounted on said body, a cap including a plate and an elongated hollow slotted member secured to the outer end of the clutch body, clutch mechanism carried by the cap and including a shoe, a lever, adjustable means carried by the shoe for engaging the lever, said lever having an end projecting outwardly from the pulley and entered in a slot of the elongated member, and slidable clutch actuating means operative in the elongated member and coacting with said lever.

4. In a clutch pulley, the combination with a rotatable shaft, of a clutch body member mounted on and fixedly secured to the shaft, a pulley loosely mounted on said body, a cap secured to the outer end of the clutch body member, clutch mechanism including a shoe adapted to engage the pulley, means for moving the shoe to clutch the pulley, and means carried by the shoe and coacting with the cap to move the shoe out of contact with the pulley.

5. In a clutch pulley, the combination with a rotatable shaft, of a clutch body member fixedly secured to the shaft, a pulley loosely mounted on said body, a cap secured to the clutch body member, clutch mechanism including a shoe adapted to engage the pulley, means for moving the shoe to clutch the pulley, and means carried by the shoe and coacting with the cap to move the shoe out of contact with the pulley, said means including a spring pressed pin having an end located in a recess of the cap.

6. In a clutch pulley, the combination with a rotatable shaft, of a clutch body member fixedly secured to the shaft, a pulley loosely mounted on said body, a cap secured to the clutch body member, friction shoes and levers pivotally supported on the cap, adjustable lever contacting means between the shoes and levers, and clutch actuating means coacting with said levers.

7. In a clutch pulley, the combination with a rotatable shaft, of a clutch body member fixedly secured to the shaft, a pulley loosely mounted on said body, a cap including an elongated slotted hollow member secured to the clutch body member, friction shoes mounted on and pivotally supported by the cap, pivoted arms supported by the cap and projecting therefrom and having ends entered in slots in the elongated member, adjustable contacting means disposed between the arms and shoes, and clutch actuating means operative in the elongated member.

8. In a clutch pulley, the combination with a body member, a pulley loosely mounted on said member, an annular member secured to the outer end of the body member, a hollow slotted member projecting forwardly from the annular member, clutch mechanism carried by the annular member and including a pivotally mounted friction shoe and a lever projected forwardly of the pulley and having its end entered in a slot of the elongated member, and slidable clutch actuating means coacting with said lever.

9. In a clutch pulley, the combination with a body member, a pulley loosely mounted on said body, a hollow elongated member projecting forwardly of said body, clutch mechanism including a shoe and a member projecting forwardly of the pulley, and actuating means operative in the elongated member and coacting with the forwardly projected member.

In testimony whereof I affix my signature in presence of two witnesses.

JOHN W. JACKSON.

Witnesses:
P. H. MACK,
W. E. BURDICK.

Copies of this patent may be obtained for five cents each, by addressing the "Commissioner of Patents, Washington, D. C."